United States Patent [19]
Chiu et al.

[11] Patent Number: 5,734,833
[45] Date of Patent: Mar. 31, 1998

[54] SHARED COMMUNICATIONS CHANNEL WITH ENHANCED RESERVATION AND COLLISION RESOLUTION PROTOCOLS ALLOWS ANY SUBSET OF STATIONS TO TRANSMIT DATA AFTER COLLISION OCCURED IN CONTENTION SLOT

[75] Inventors: Ran-Fun Chiu, Los Altos; Ning Bi, San Diego, both of Calif.

[73] Assignee: Hewlett-Packard Company, Palo Alto, Calif.

[21] Appl. No.: 614,987

[22] Filed: Mar. 12, 1996

[51] Int. Cl.$^6$ .................................................. G06F 13/00
[52] U.S. Cl. ............................. 395/200.55; 395/200.6; 395/200.83
[58] Field of Search .............................. 370/352, 348, 370/447, 346, 445, 347; 395/200.6, 200.83

[56] References Cited

U.S. PATENT DOCUMENTS

| | | | |
|---|---|---|---|
| 4,745,599 | 5/1988 | Raychaudhuri | 370/348 |
| 4,774,707 | 9/1988 | Raychaudhuri | 370/447 |
| 5,229,993 | 7/1993 | Foudriat et al. | 370/445 |
| 5,297,144 | 3/1994 | Gilbert et al. | 370/346 |
| 5,541,924 | 7/1996 | Tran et al. | 370/347 |
| 5,570,355 | 10/1996 | Dail et al. | 370/352 |
| 5,594,738 | 1/1997 | Crisler et al. | 370/347 |

OTHER PUBLICATIONS

Capetanakis, John I., "Generalized TDMA: The Multi-Accessing Tree Protocol", IEEE Transactions on Communications, vol. Com–27, No. 10, Oct. 1979, pp. 1476–1484.

Capetanakis, John I., "Tree Algorithms for Packet Broadcast Channels", IEEE transactions on Information Theory, vol. IT–25, No. 5, Sep. 1979, pp. 505–515.

Mathys, Peter et al., "Q–ary Collision Resolution Algorithm in Random–Access Systems with Free or Blocked Channel Access", IEEE Transactions on Information, Theory, vol. IT–31, No. 2, Mar. 1985, pp. 217–243.

Oie, Yuji, et al., "Throughput and Delay Analysis of Free Access Tree Algorithm with Minislots", IEEE Transactions of Communications, vol. 38, No. 2, Feb. 1990.

Wu, Cheng–Shong et al., "Delay Analysis of Tree Conflict Resolution Algorithm With and Without Broadcast Reservation Using Random or Pseudo Random Addressing", pp. 1324–1328.

(List continued on next page.)

*Primary Examiner*—Frank J. Asta
*Assistant Examiner*—Le Hien Luu

[57] ABSTRACT

A system and method for collision resolution in a communication system having multiple transmission stations communicating on a shared slotted communication channel. The system and method includes a procedure for organizing the stations in a structure wherein each station has a fixed address corresponding to a static location in the structure. The procedure further indicates to the multiple transmission stations a slot type for each communication slot, the slot type selected from a group including contention slot type and reservation slot type, and accepts transmissions of contention slot data packets in contention slots on the communication channel from the stations, the contention slot data packets each optionally containing a reservation quantity for reservation slot data packets to be sent by an originating station upon successful transmission of a contention slot data packet originating at the originating station, the reservation slot data packets transmitted in reservation slots dedicated to the originating station. The procedure detects collisions in the transmissions of packets originating from the transmitting station with packets transmitted from other transmitting stations; and upon detecting a collision in a contention slots, recursively entitles a subset of the locations in the structure to transmit in the subsequent contention slot regardless of whether the station transmitted during the contention slot in which the collision occurred, wherein membership in the subset indicates that a station corresponding to a location in the subset is entitled.

Further systems and methods are disclosed.

12 Claims, 11 Drawing Sheets

OTHER PUBLICATIONS

Merakos, Lazaeros F., et al., "Delay Analysis of the n–Ary Random–Access Algorithm", IEEE Transactions on Information Theory, vol. 34, No. 5, Sep. 1988.

Polyzos, George C. et al., "Performance Analysis of Finite Nonhomogeneous Population Tree Conflict Resolution Algorithms Using Constant Size Window Access", IEEE Transactions on Communications, vol. Com–35, No. 11, Nov. 1987.

Molle, Mart L. and Polyzos, George C.; "Conflict Resolution Algorithms and their Performance Analysis", Technical Report No. CS93–300, Computer Systems Research Institute, University of Toronto, Jul. 1993.

5,734,833

SHARED COMMUNICATIONS CHANNEL WITH ENHANCED RESERVATION AND COLLISION RESOLUTION PROTOCOLS ALLOWS ANY SUBSET OF STATIONS TO TRANSMIT DATA AFTER COLLISION OCCURED IN CONTENTION SLOT

CROSS REFERENCE TO RELATED APPLICATIONS

This application is related to copending application Ser. No. 08/532,918, entitled "High-Speed Data Communications Network System and Method," filed Sep. 22, 1995, commonly assigned with the present invention. The entire disclosure of the co-pending application Ser. No. 08/532,918 is incorporated herein by reference.

FIELD OF THE INVENTION

The present invention relates to data communication, and more particularly to collision resolution on a shared channel.

BACKGROUND OF THE INVENTION

Formerly, computer networks were in the province of academia, large research communities, corporations, and governmental agencies. Over time, these networks have evolved to contain many more computer users and uses within their domains. Furthermore, the networks have to a large extent become connected ("internetworked") to form a world wide network of computers known as the Internet and new types of computer networks have become available. Thus, it has become more likely than not that a computer is connected to some type of computer network.

While information distribution is an important use of computer networks, computer connectivity provides many other valuable services. One example is electronic mail. Another is electronic commerce.

For all these reasons, it has become generally recognized that while in the past it was true that being connected to a network or an on-line service could provide a competitive advantage, in modern business and for the sake of education, it has become a necessity.

Many users of on-line services and the Internet connect to these networks via modems and conventional telephone lines. While this is adequate for some uses, it is undesirable for others. It is has the advantage of providing a dedicated connection between a user and a computer to which that user is connected. And it makes use of a connection line, the telephone line, which most households and offices are already connected to. By providing a dedicated connection to the user, there is no need for resolving collisions between users who attempt to access the network simultaneously. All such conflicts are resolved at the computer to which the multiple users are connected. (Of course, if that computer is connected to other computers on shared lines, conflicts between these computers must be resolved).

However, telephone lines are a less than ideal way of connecting computers. First, there is the obvious drawback that in a home-computing environment, a home may be equipped with only one telephone line. Thus, extended on-line use would tie-up the telephone line, which might be needed for other uses. There are also technical problems with telephone lines. These lines are intended for voice communication having a transmission band-width limited to 3.2 KHz. As a consequence, digital communication over telephone lines is of a relatively low bit rate. Typically, a modem modem connecting a personal computer to a telephone line is limited to 28.8 kbps.

It is therefore desirable to provide alternative technologies for connecting home computers to computer networks.

A technology that has made its way to most homes and small-offices is cable tv networks. Unlike telephone networks, which provide dedicated lines to each home, in cable tv systems all subscribers in a neighborhood share the cable. However, there is much greater band-width available, as compared to telephone lines, on the cables used by most cable tv systems.

For these reasons it is desirable to provide two-way data communication between home/small-office computers and computer networks over existing cable tv systems.

Because all the cable tv subscribers in one neighborhood share one cable, there is a possibility that multiple computers connected to such a network would simultaneously transmit data on that cable. Such concurrent transmission would result in garbled data and neither transmitter's message would be successfully received by the intended recipient, unless there is a mechanism for avoiding or resolving such contention problems.

The problem of avoiding contentions on shared computer networks have been addressed in a variety of ways. One early approach is known as the ALOHA system. ALOHA originated at the University of Hawaii and was initially primarily used for communication using broadcast radio. The communication over a shared cable is also a broadcasting system in that all stations attached to the cable receive any signal that is transmitted over that cable.

ALOHA's basic principle is to allow every user who shares the common channel to broadcast a message at any given point in time. The transmitting user then listens to the channel for its own message. If the message is not received (by the user who sent it), the user knows that the message must for some reason have become destroyed. Very likely, the message was destroyed by another message simultaneously sent by another user. To resolve this collision for the common channel both users "back-off" a random amount of time before resending the message. Thus, if two users attempt to send a message at time t, their respective messages would become destroyed. By backing off random amounts of time, the first user would resend its message at t+r1 and the second user its message at t+r2. If r1 and r2 are different (which they should usually be if they are truly randomly selected), there should be no conflict between the two messages the second time they are sent.

A drawback to ALOHA is that the likelihood of collisions is very high. The channel efficiency rate for ALOHA is a mere 18%.

One improvement of ALOHA is slotted-ALOHA. In slotted-ALOHA, time is divided into specified intervals and messages may only be sent during these intervals, i.e., no message is allowed to span over interval boundaries. The channel efficiency of slotted-ALOHA is 36%.

For a discussion of ALOHA, slotted-ALOHA and the derivation of the channel efficiency rates see, Tanenbaum, Andrew, *Computer Networks*, second edition, Prentice-Hall, pp. 121–124.

Another conflict resolution method for communiations on a shared channel is the "tree conflict resolution" method, which is described in J. I. Capetanakis, "Tree algorithm for the packet broadcast channels," *IEEE Trans. On Inform. Theory*, IT-25, pp. 505–515, September 1979 (hereinafter, Capetanakis). In the tree conflict resolution algorithm, all stations are organized in a tree such that each station is associated with a leaf-node (For the sake of this discussion, it will be assumed that the tree is a binary tree). When a collision happens, the stations involved are divided into two halves, say those represented by leaf-nodes in the left sub-tree and those represented by leaf-nodes in the right sub-tree. The collision is then resolved by only allowing the stations corresponding to leaf-nodes in one of those sub-trees to transmit. In the next slot, the stations of the other sub-tree is allowed to transmit.

If the transmission by the nodes of a sub-tree results in a collision, the subdivision of the tree is continued until a collision does not occurr. A collision will not occur when either no station in the subtree is transmitting or when only one node is transmitting. In the extreme case, the subdivision reaches the leaf-node level, in which case a collision is not possible since a leaf-node by definition corresponds to only one station.

The division into subtrees can either be based on addresses or upon the arrival times of packets. Furthermore, the addresses can be assigned on the basis of random coin flips (random addressing) or correspond to the physical station addresses (deterministic addressing). A collision resolution system based on random addressing is analyzed in P. Mathys and P. Flajolet, "Q-ary collision resolution algorithms in ranm-access systems with free or blocked channel access," *IEEE Trans. On Inform. Theory*, IT-31, no. 2, pp. 217–243, March 1985 (hereinafter, Mathys). Capetanakis, ibid, discloses the use of deterministic addressing.

The traversal of the tree is referred to as an epoch. An epoch is either a collision free slot or a contention slot with a collision and the collision resolution slots following that contention slot.

In Capetanakis conflict resolution algorithm, any packets arriving at a nonactive station during an epoch are not transmitted until the next epoch. For example, if time slots are numbered sequentially, and in time slot t a collision occurrs due to the simultaneous transmission by two stations $S_1$ and $S_2$, time slot t+1 is a collision resolution time slot. Suppose, that in time slot t+1 a third station, $S_3$, has a packet to transmit, then, because slot t+1 is a collision resolution slot for a collision which $S_3$ did not participate in, $S_3$ must wait until the next epoch to transmit its packet.

In a finite population of transmission stations it has been established that the deterministic addressing scheme performs better than the random addressing scheme. However, a disadvantage to the deterministic addressing scheme is that, given a particular traversal order, e.g., lower addresses before higher addresses, the algorithm is not fair in that certain stations will always have their collisions resolved first. To have fair and efficient addressing, Wu and Li (C. Wu, and V. Li, "Delay analysis of tree conflict resolution algorithm with and without broadcast reservation using random or pseudo random addressing," *IEEE ICC '91*, pp. 1324–1328.) introduced a method in which a transmission address is used to replace the fixed physical address. The transmission address is updated from time to time. Although the station addresses are rearranged pseudo randomly for every epoch, the average transmission delay is still different for each station in an epoch.

Mathys disclosed a system using the tree algorithm for collision resolution. Mathys system uses free channel access (Mathys also discusses blocked channel access) for new packets. In Mathys' free access algorithm all new packets that arrive during a collision resolution interval are allowed to transmit without having to adhere to the collision resolution procedure.

It is desireable to have a collision resolution process that has a delay property that is fair to every station in the system.

In Capetanakis tree protocol stations are limited to one packet per epoch. If more than one packet is queued at a station, only the first one is transmitted in any given epoch, and the remaining packets are transmitted in subsequent epochs. The remaining packets are therefore all subject to collision.

Wu and Li, supra, introduced a transmission protocol in which a transmission cycle has two portions, a collision resolution cycle (CRC) and a collision free cycle (CFC). In Wu and Li's protocol, if a station has multiple packets to transmit, the head-of-queue packet is transmitted in the CRC and the remaining packets (rest-of-queue) in the CFC. Each station keeps track of the number of packets to be transmitted in the CFC by a station that had a successful transmission in the CRC. All of the rest-of-queue packets are transmitted after all head-of-queue packets have been successful transmitted in the CRC.

It would be desireable to have a simplified reservation protocol that operates in conjunction with a fair and simple collision resolution protocol.

Other advantages and features of the invention will be made apparent in connection with the following detailed description.

SUMMARY

It is an object of the invention to provide high-speed two-way data communication on a network of computers connected by one cable.

It is a further object of the invention to provide a reservation system to allow client stations in a network to communicate with a signal conversion system.

It is a further object of the invention to provide an efficient collison resolution procedure.

It is a further object of the invention to provide a collision resolution procedure with fixed addresses that is fair to all subscriber stations in a computer network.

These and other objects are achieved by providing a computer network for high-speed data communication, having a data transmission cable with a root and at least one leaf node. A signal conversion system (SCS) is attached to the root, and at least one client station is attached to a leaf node. The SCS consists of a transmitter that transmits down-stream data onto said cable in a first frequency band; and a receiver that receives data from said client stations on a second frequency band; wherein said down-stream data includes synchronization and acknowledgement signals. Each client station has a receiver that receives data on said first frequency band, and a transmitter that transmits data on a second frequency band according to synchronization signals received on said first frequency band.

The computer network is controlled by a method comprising transmitting down-stream from the signal conversion system (SCS) a control signal having synchronization information on a first frequency band, receiving said control signal at client stations, transmitting up-stream from said client stations to said SCS on a second frequency band, the transmission being timed with respect to said synchronization information, and acknowledging on said first frequency band successful receipt by said SCS of said up-stream transmission.

The client station's transmission packets may include requests for reserved slots on said second frequency band for subsequent transmissions, and the SCS has a scheduler operable to determine a start time for requested reserved slots, and transmits the start time for the requested reserved slots. The client stations are operable to wait to continue transmission until after waiting for the start time.

The SCS detects the collision of packets transmitted from multiple client stations. These collisions are resolved by selectively giving access to the shared channel to a subset of the client stations. This selection is recursively applied to smaller and smaller subsets until no collisions occurr. If during the collision resolution procedure additional packets appear at the client stations, these packets may be transmitted by those client stations that are enabled regardless of whether the client stations or packets participated in the transmission that created the original collision that is being resolved.

To make efficient use of the shared channel and interleaving scheme is used in which the multiple client stations attached to the network are grouped. There are as many groups as the maximum length of propagation delay measured in number of slots. The SCS communicates on the control channel the group number that is allowed to transmit in a given slot.

DETAILED DESCRIPTION OF THE PREFERRED EMBODIMENTS

Figure 1:
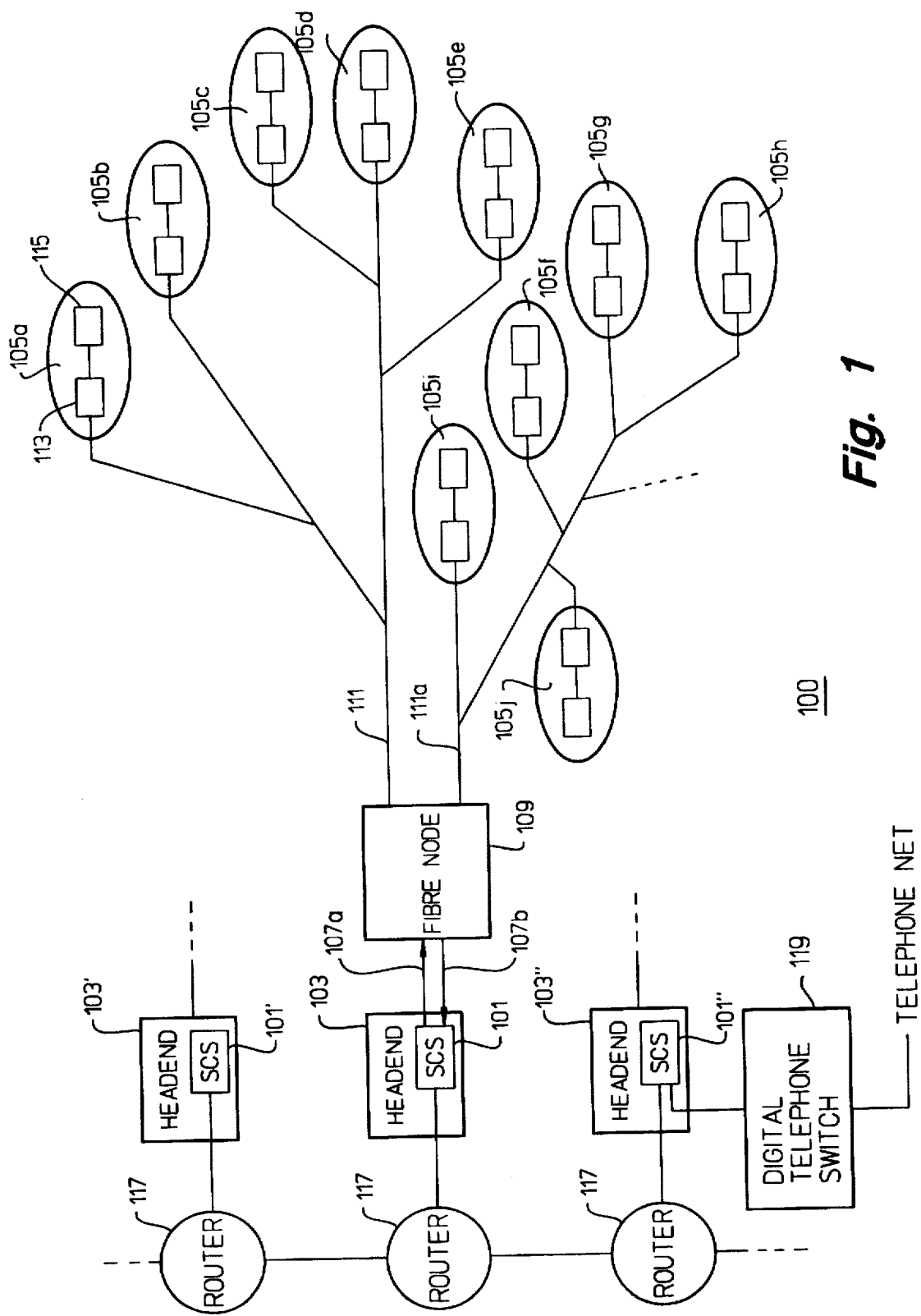
FIG. 1 is an illustration of a neighborhood cable tv system adapted according to the present invention to provide data-communication between a Signal Conversion System (SCS) located at the head-end and client stations located at the subscriber locations.

FIG. 1 is an illustration of a neighborhood cable tv system 100 adapted according to the present invention to provide data-communication between Signal Conversion System (SCS) 101 located at a head-end 103 and client stations 105a–j located at subscriber locations. Each SCS 101 is connected to a packet router 117 that routes data packets to and from remote server stations. In an alternative connection scheme, an SCS 101, e.g., 101", interfaces locally or remotely to a circuit switcher 119 for circuit switched constant bit rate services. The latter may be used to provide a digitized voice connection to a telephone network.

In many cable tv systems about 500 to 2000 subscribers are attached to the same headend 103. The headend 103 communicates with the various subscriber locations 105 via optic fibre cables 107a and 107b connected to a fibre node 109. The fibre node 109 is further attached via coaxial cables 111a and 111b. The fibre node 109 contains a mechanisms for converting between optical and electrical signals. The connections between routers 117 and the SCSs 101 is communicated in a digital form. However, the communication between the headend 103 and the subscriber locations is in an analog form.

The role of the SCS 101 is to provide a signal conversion between the digital communications that occur in between routers 117 and the analog communications on the optic fibre and coaxial cables of a Cable TV system.

Each client station 105 contains a Cable modem 113 connected to a computer 115. In alternative embodiments the computer 115 is substituted with other devices that would benefit from data communication with the headend 103 over the cable 111. Examples, of such alternatives include set-top boxes for making requests for particular cable tv operations, e.g., video-on-demand type services, and interactive television.

Figure 2:
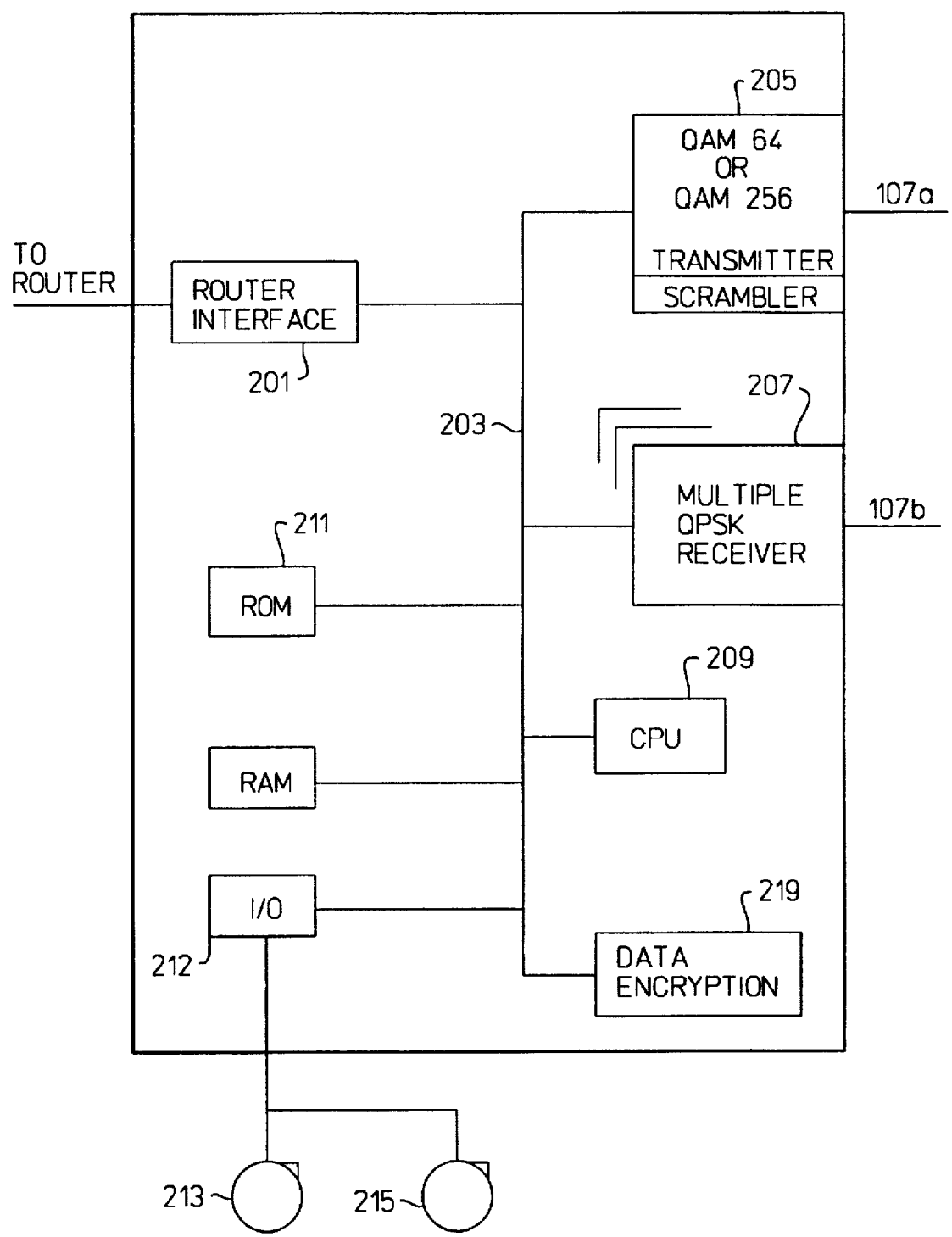
FIG. 2 is a schematic of Signal Conversion System (SCS) according to the present invention.

FIG. 2 is a block diagram of the Signal Conversion System (SCS) 101. The Signal Conversion System (SCS) 101 is attached to the fibre cables 107a and 107b. Using a transmitter 205 the SCS 101 transmits data using QAM64 or QAM256 transmission format onto the fibre cable 107a. Using multiple receiver 207, the SCS 101 receives QPSK data on several channels on the fibre cable 107b. Both transmitter 205 and receiver 207 are connected to a SCS bus 203.

The SCS 101 contains a router interface 201 that is connected to a router 117. The ROUTER interface 201 receives and transmits digital data packets, for example internet protocol (IP) packets, or ATM cells, to the router 117. The ROUTER interface 201 is connected to the internal bus 203 for transferring data to and from other components of the SCS 101.

A Central Processing Unit (CPU) 209 manages the conversion of data between QAM64, QPSK, and the digital packet format of the router interface 201. The CPU 209 also directs data traffic on the bus 203. Furthermore, much of the data transmitted and received on cables 107a and 107b require extensive processing and formatting. The CPU 209 is responsible for this processing and formatting. Many of the procedures for controlling the operation of the CPU 209 are stored in a ROM 211 connected to the bus 203. A RAM 213 for storing data during processing and retransmission is further connected to the bus 203. Other procedures for controlling the operation of the SCS 101 and its components such as CPU 209 are stored in secondary storage devices 213 and 215, both connected to the bus 203 via an I/O unit 217.

Figure 3:
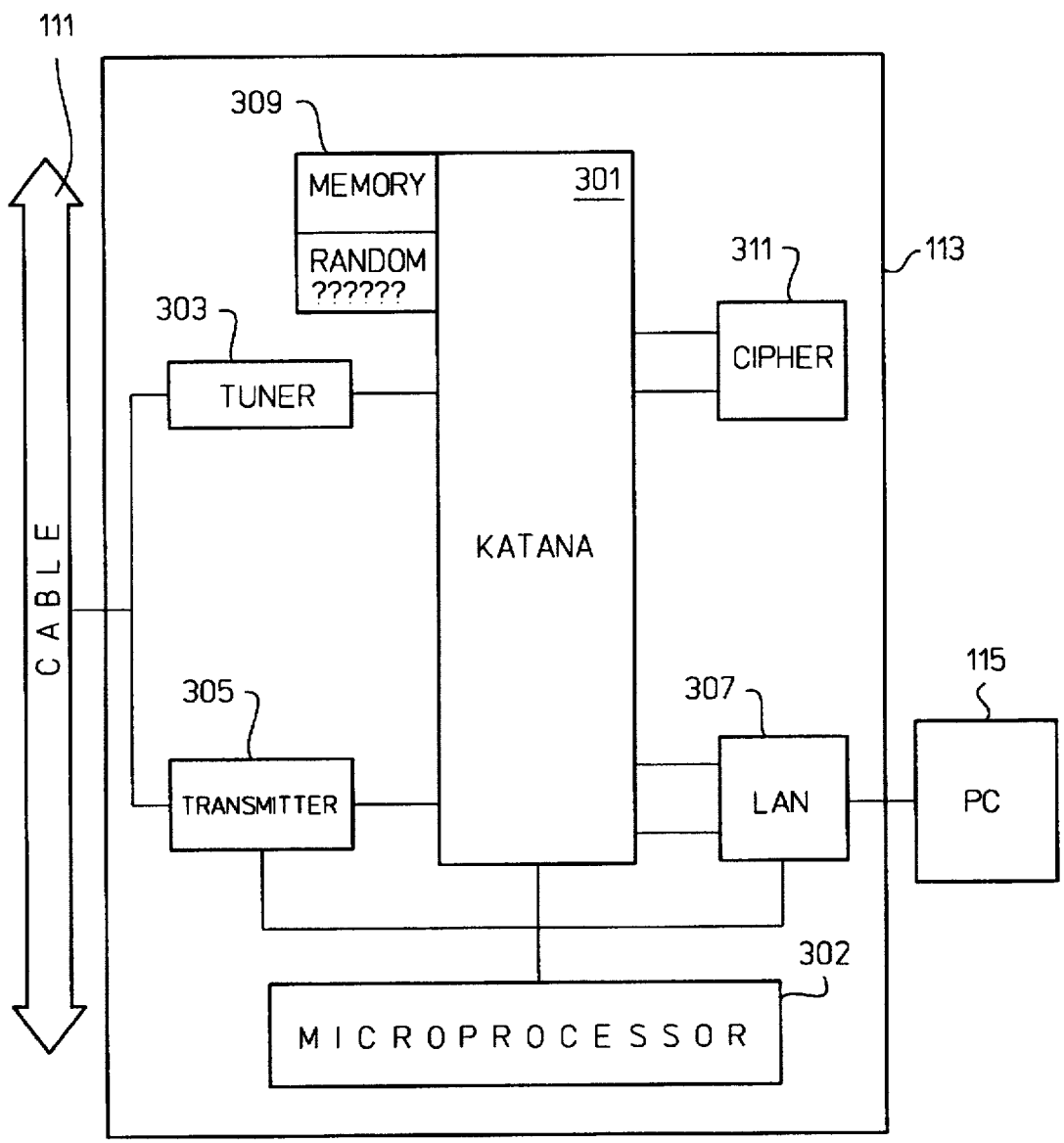
FIG. 3 is a high-level schematic of a cable modem used in accordance with the cable tv system of FIG. 1.

FIG. 3 is a high-level schematic diagram of the cable modem (CM) 113 connected to a cable 111 and a personal computer (PC) 115. The CM 113 receives data signals from the cable into a tuner 303 and transmits data signals onto the cable by a transmitter 305. In the preferred embodiment, the tuner and 64 QAM demodulator 303 is a 64 QAM receiver and the transmitter is a QPSK transmitter.

At a high-level of description, the CM 113 is responsible for filtering signals transmitted between the PC 115 and the cable 111, for encrypting/decrypting these signals (as necessary), for buffering data, and for translating between the communication protocol for on-cable transmissions and for modem-to-PC transmissions. These and other functions (as discussed below) are accomplished by a variety of component circuits. The heart of the CM 113 is a control circuit 301. The control circuit 301 is connected to the other component circuits, and with the aid of a microprocessor 302 controls timing, and device sharing among the various other component circuits.

The communication between the CM 113 and the PC 115 is accomplished by a local area network (LAN) transceiver circuit 307. The LAN circuit is connected to the control circuit 301. In the preferred embodiment, the particular i/o interface between the CM 113 and the PC 115 uses the 10-baseT protocol, but other modem-to-PC protocols are acceptable alternatives. In alternative embodiments, other LAN protocols, such as Hewlett-Packard Company's 100BaseVG protocol may be used.

Information transmitted between the PC 115 and the cable 111 are buffered in the cable modem in a random access memory 309 connected to the control circuit 301. As discussed below, communication between the CM 113 and the cable system is subject to collision with messages being sent by other client stations 105. Furthermore, collisions are avoided by using a reservation system. The collision handling and reservation system is transparent to the PC 115. Therefore, while waiting to be transmitted a message is buffered in the RAM 309. Furthermore, additional processing of an incoming or outgoing message is required by the CM 113 prior to retransmission to the cable 111 or the PC 115, respectively. Such processing includes encryption and decryption. The encryption/decryption is executed by a cipher circuit 311 connected to the control circuit 301.

Communication over the cable 111 is possible by using frequency multiplexing techniques over a frequency range from 5 MHz to 750 MHz. Standard tv channels are usually transmitted in the above 54 MHz range. Each such channel is 6 MHz wide. Typically the below 50 MHz frequencies are unstructured and very noisy. In the preferred embodiment, up-stream communication (communication from the CM 113 to the SCS 101) occur on a 2 MHz wide frequency band in the 5 to 42 MHz frequency spectrum, and down-stream communication (from the SCS 101 to the CM 113) occur on a standard 6 MHz wide tv channel in the 54 MHz and above range, and is referred to hereinafter as the down-stream channel. Thus, the 5 to 42 Mhz band serves as the spectrum in which a communication channel from the client stations 105 to the SCS 101 can be selected and the band above 54 MHz serves as the spectrum from which communication channels from the SCS 101 to the client stations 105 can be selected.

Alternative embodiments provide for multiple communication channels in each direction. Such alternatives are natural extensions of the described preferred embodiment and are within the scope of the present invention. For illustrative purposes, the present invention is described in the context of the one-channel per direction embodiment. However, a person skilled in the art will realize how to apply the invention to the multiple-channel alternatives.

Figure 4:
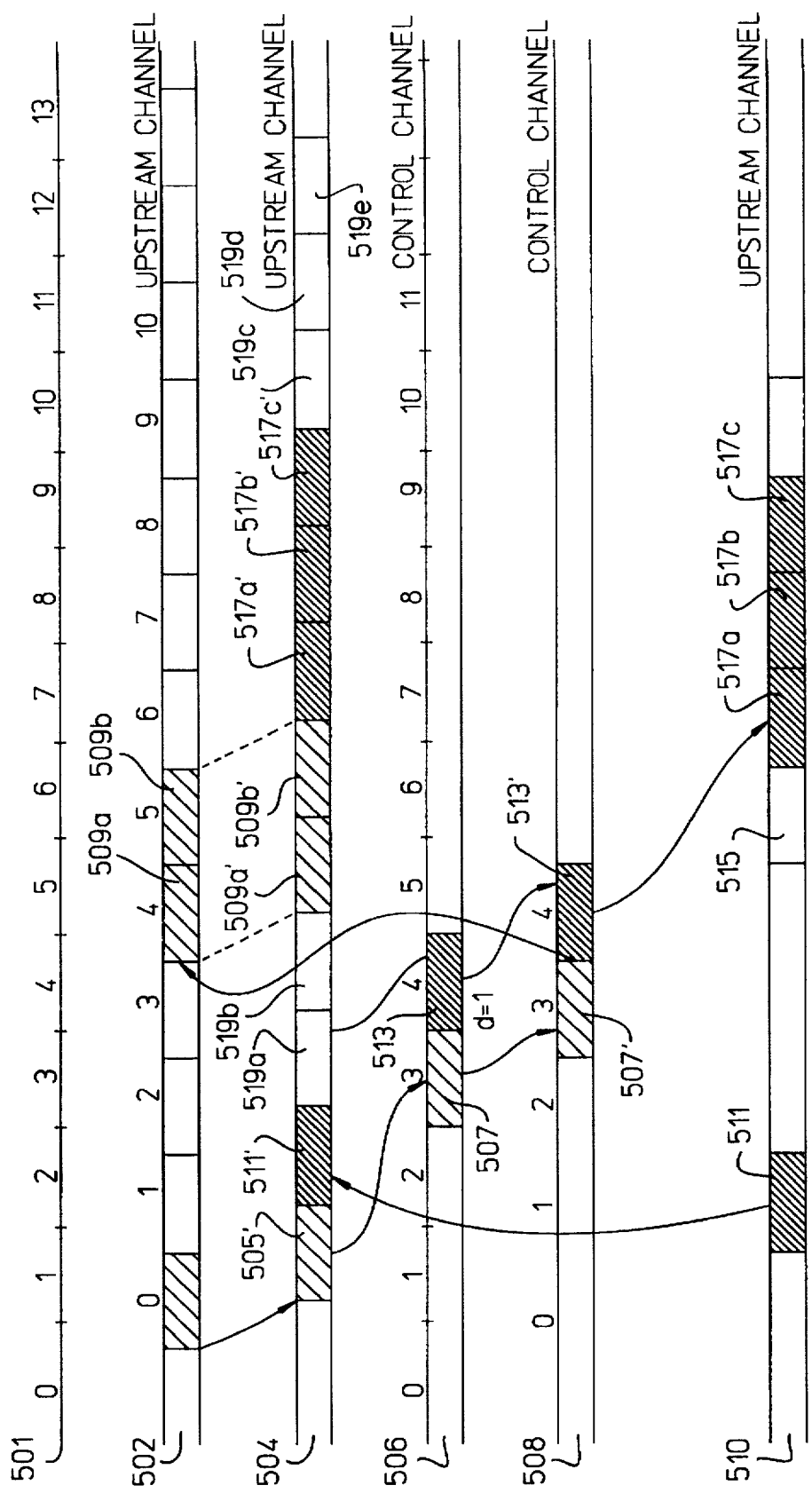
FIG. 4 is an illustration of exemplary activity on the down-stream channel and up-stream channel.

FIG. 4 is an illustration of exemplary activity on the down-stream channel and up-stream channel. For up-stream communication time is divided into even-length intervals called slots. Each slot is identified by a number. Slot numbers are sequential and range from 0 to a Maximum_Count with the slot number reset to 0 after the Maximum_Count is reached. In the preferred embodiment the Maximum_Count is less than 32. Other embodiments would allow larger Maximum_Count values. The Maximum_Count is programmable by the SCS. In the illustration of FIG. 4, 13 slots (0 through 12) are illustrated by time line 501. The slot boundaries of time line 501 are with respect to the Signal Conversion System (SCS) 101. Because there are time delays associated with the propagation of data along the cable, the various client stations 105 will communicate and receive data at different boundaries.

A time slot is basically a time slice from the upstream channel bandwidth. Its length is represented by a fixed number of downstream control channel frames. The number of frames per slot is programmable by the Signal Conversion System (SCS) 101. However, this ratio (frames/slot) remains fixed until reset. The time slot is sized to include the time required to transmit the largest allowed transmission packet upstream during contention and the difference in round-trip propagation delay between the client station 105 nearest to the SCS 101 and the client station 105 furthest away from SCS 101 without using ranging techniques.

Figure 5:
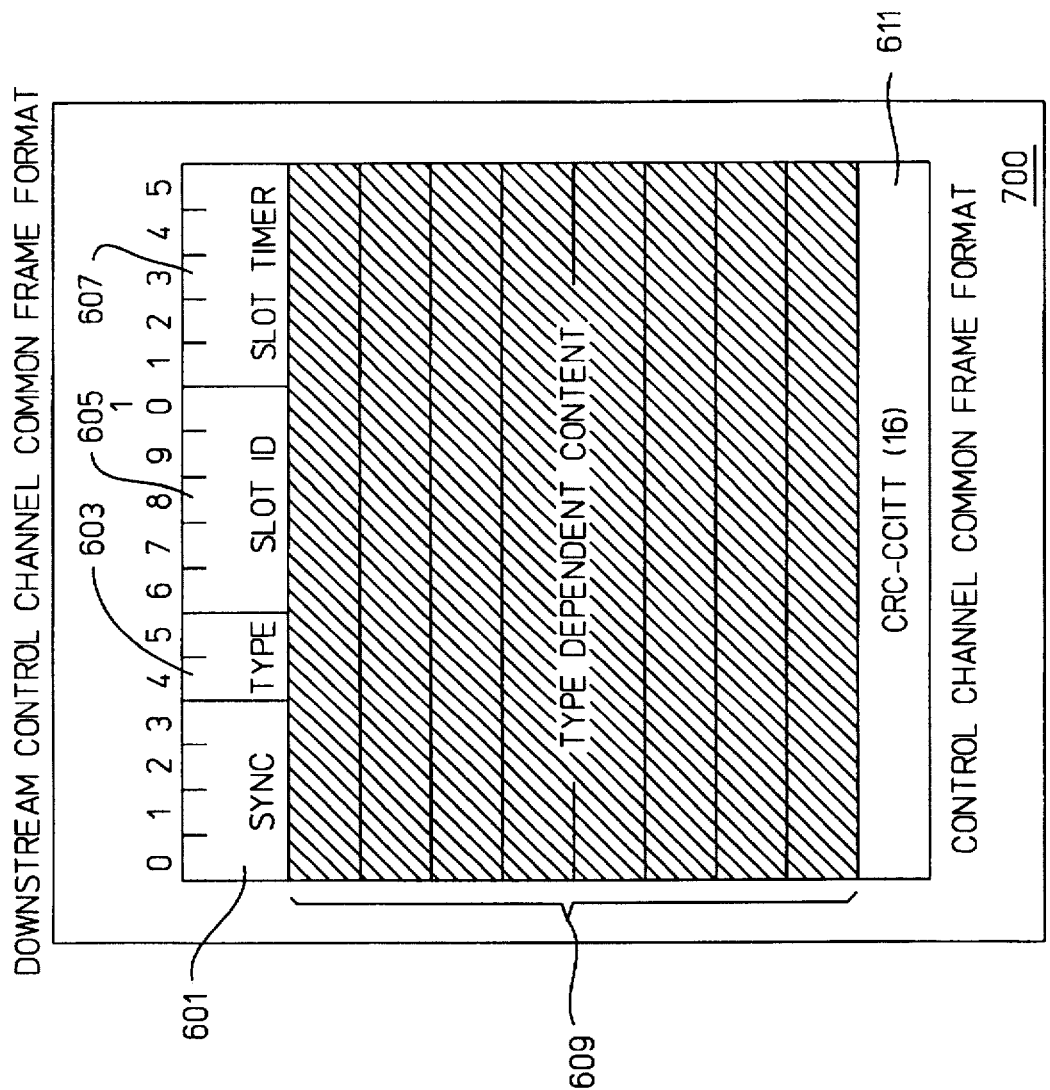
FIG. 5 is an block diagram of the common frame format for the downstream control channel.

A control frame is the basic unit of communication between the Signal Conversion System (SCS) 101 and the various client stations 105 in the control channel. In the preferred embodiment a control frame is 20 bytes long. There is a common frame format. FIG. 5 is an block diagram of the common frame format. Each frame follows the general structure shown in FIG. 5. Each frame starts with a Sync flag 601. The framing of the downstream control channel uses the SYNC flag 601 to denote the beginning of the frame. In the preferred embodiment the SYNC flag has the value "0110", but other bit sequences may be adopted by convention.

In the preferred embodiment there are 4 types of frames: acknowledgment frame, control frame, variable bit rate (VBR) data frame, and constant bit rate (CBR) data frame. The type is identified by the type field 603. Next is a five bit field giving the Slot ID for the frame 605. The maximum value for the Slot ID is programmable by the Signal Conversion System (SCS) 101.

Slots are divided into two classes: contention slots and reserved slots. During a contention slot, all of the client stations 105 or a subset of client stations 105 may transmit onto the up-stream channel. Reserved slots are dedicated to one particular client station 105 and only that particular client 105 may transmit packets of information on the up-stream channel.

In the illustration of FIG. 4, two client stations 105a and 105b compete for time on the upstream channel. Line 502 is an illustration of the transmissions placed on the upstream channel by client station 105a, line 504 is an illustration of the reception of messages on the upstream channel by the Signal Conversion System (SCS) 101, line 506 is an illustration of the transmissions placed on the control channel by the Signal Conversion System (SCS) 101, line 508 is an illustration of the reception of messages on the control channel by the client stations 105a and 105b, and line 510 is an illustration messages placed on the upstream channel by the client station 105b.

The messages sent out by the Signal Conversion System (SCS) 101 sets the beat for upstream transmissions. During contention slots, all transmissions are done such that a transmission packet is communicated in its entirety within a slot. However, during reserved slots, a packet of data may cross slot boundaries. The client stations 105 monitors the control channel to find out when slots begin and end. Because of transmission delays, these slot boundaries are perceived to be at different times by the various client stations 105, depending on distance from the Signal Conversion System (SCS) 101.

In line 502 of FIG. 4 client station 105a sends in time slot 0 a request 505. Because of the propagation delay, from the perspective of the Signal Conversion System (SCS) 101, the client station 105a commences the transmission part of the way into time-slot 0.

In the following discussion, for illustrative purposes, packets of data are shown as consuming entire time-slots. In reality a packet consumes less than a time-slot and the time-slots are sized such as to allow for round-trip propagation delays between the subscriber station 105 nearest the SCS 101 and the subscriber station 105 furthest away from the SCS 101 without ranging. Packets of information are indicated as the received version of a packet sent by another station by using the same reference numeral suffixed with an apostrophe, e.g., a client station may send a packet 505, when received, it is shown as packet 505'.

Line 504 is an illustration of the view of the up-stream channel from the perspective of the Signal Conversion System (SCS) 101. Again, because of the propagation delay, the Signal Conversion System (SCS) 101 receives the packet 505 at a time later than when it was sent, as is indicated by packet 505'. The Signal Conversion System (SCS) 101 then processes the packet 505. A packet of data sent from the client station 105 may be self-contained, i.e., it is a complete communication of information to the Signal Conversion System (SCS) 101. But, because sometimes a client station 105 desires to transmit more information than will fit in one packet, i.e., more than what can be transmitted in one time slot, an initial packet sent from a client station 105 may include a request to reserve additional future slots for transmission of the balance of the communication. In the example of FIG. 4, client station 105a desires to transmit information that will span a total of three time slots. Therefore, the initial packet 505 includes a reservation request for two additional dedicated time slots.

In processing the request, the Signal Conversion System (SCS) 101 allocates two future time slots for client station 105a. Line 506 is an illustration of the control channel, from the perspective of the Signal Conversion System (SCS) 101. Subsequent to the allocation, the Signal Conversion System (SCS) 101 transmits on the control channel an acknowledgment message 507 to the client station 105. The acknowledgment message indicates to the client station 105 that the message has been received and in the case of a reservation request, how many time slots the client station must wait to transmit the balance of the communication. In the example of FIG. 4, no other reservations have been made at the time the Signal Conversion System (SCS) 105 receives the reservation request packet 505 from client station 105a, therefore the client station 105a can commence transmission of the balance of the communication upon receipt of the acknowledgment message in packet 507'. Accordingly, the acknowledgment message packet 507 indicates to the client station 105a that the delay length (the time the client station 105a must wait prior to transmitting the balance) is zero.

Due to the propagation delay, although the client station 105a commenced transmitting packet 505 in time-slot 0, it was not completely received by the Signal Conversion System (SCS) 101 until part of the way into time-slot 2. Because all transmissions are done on time slot boundaries, the Signal Conversion System (SCS) 101 waits until the beginning of time-slot 3 before commencing transmitting the acknowledgment packet 507. Line 508 is an illustration of the control-channel from the perspective of client station 105a. The acknowledgment message packet 507' is received by the client station 105a who recognizes from the message that its reservation request packet 505 has been honored by the Signal Conversion System (SCS) 101 and that its reserved slots are to be transmitted without delay. Therefore, client station 105a transmits on the up-stream channel (as illustrated as line 502) the balance of its communication in packets 509a and 509b.

In the example of FIG. 4, the client station 105b desires to transmit four packets of information. As discussed above, it may send one packet which includes a reservation request for the following three. Accordingly, the client station 105b sends a first reservation request packet 511. The request message packet 511 includes the reservation request for three time-slots.

As shown in line 504 the Signal Conversion System (SCS) 101 receives the request message 511'. In processing the request for the reservation of three additional dedicated time-slots, the Signal Conversion System (SCS) realizes that by the time the client station 105b receives an acknowledgment, the client station 105a will have transmitted the first packet 509a in the balance of its communication, but still needs an additional time slot for the second packet 509b. Therefore, the acknowledgment message packet 513 indicates to client station 105b that its reservation has been accepted and that after it receives the acknowledgment packet 513' it should commence transmitting its balance of packets after a delay of one time slot. This delay is indicated as time slot 515. Following the delay, the client station 105b transmits the balance of three packets 517a, 517b, and 517c on the upstream-channel 510. These are received by the Signal Conversion System (SCS) 101 as packets 517a', 517b', and 517c'.

Any slot that is not specifically reserved is a contention slot. Therefore, in the example, because the first reserved slot is slot number 4, slots 0 through 3 are contention slots. Slots 4 through 8 were reserved by client stations 105a and 105b. However, no reservations were made for slots 9 through 13, which therefore are contention slots.

In the example of FIG. 4, there is no collision during contention slots. A collision between client station 105a and 105b may have occurred at some time before time-slot 0. Each frame contains a checksum. The checksum is a cyclic redundancy check, for example as defined by CCITT X.25.

When a collision occurs the messages become garbled. Therefore, the checksum calculation fails. Whenever the Signal Conversion System (SCS) 101 detects that the checksum calculation has failed, it does not send the acknowledgment message. Hence, neither client station 105 would receive an acknowledgment. The expected time delay between sending a message and receiving the acknowledgment is known (it is the maximum propagation delay plus processing time). Thus, when a client station 105 does not receive the acknowledgment within this expected time, it knows that the transmission failed. Because collisions are a likely source of transmission failure, the collision resolution mechanism of the SCS 101 and the client station 105 is invoked.

In the present invention collision handling is accomplished by only allowing retransmission from certain groups of modems. On a retry, a subset of the modems that were allowed to transmit when the collision occurred are allowed to transmit. In this embodiment, the CMs 113 in the system are arranged in a binary tree. When the SCS 101 detects that it is receiving garbled messages, it sends out messages to enable a subset of certain CMs 113. At first the SCS 101 descends one level from the root of the tree and recursively enables smaller subsets CMs in the first half of the tree with the modems outside of the enabled subset being disenabled. If in the next contention slot the SCS 101 does not detect a collision, it then reactivates the Cms in the first half of the tree and turns off the second half. If the SCS 101 still detects collisions, it descends one more level and branch-by-branch successively turns enables and disenables all CMs in a particular branch at that level. The SCS 101 repeats this procedure until either it no longer detects collisions or until it has descended to the leaves of the binary tree.

Figure 7A:
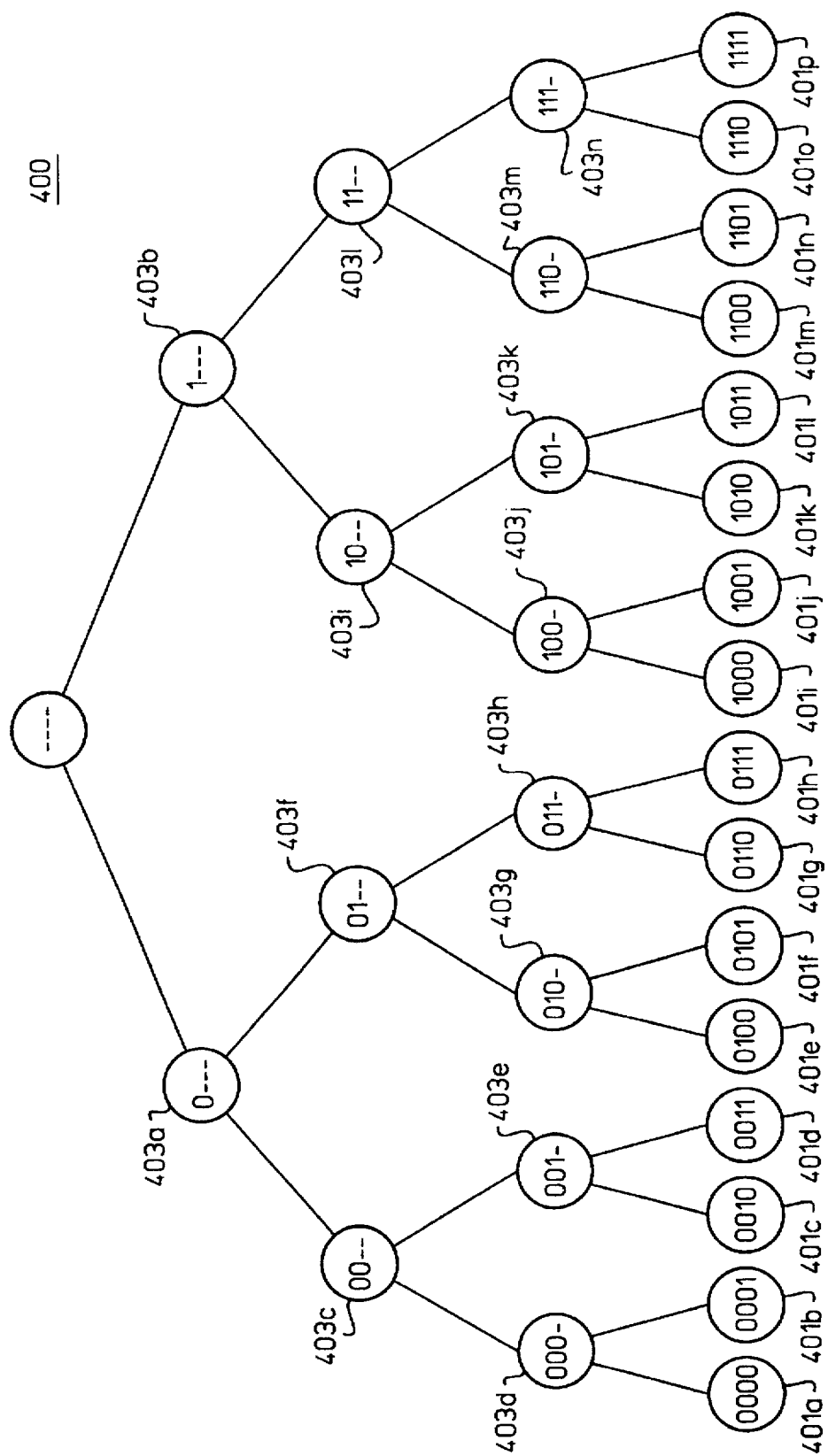
FIG. 7(a) is a schematic of an exemplary collision resolution tree.

FIG. 7(a) is an example of a binary tree 400 for organizing the subscriber stations 105. There is one leaf-node 401 for each subscriber station 105. Each leaf-node 401 has associated with it a particular binary address, as shown.

Each internal node 403 has associated therewith an address. Each internal node is a root to a subtree wherein each node's address has a certain number of common most significant bits. That certain number of most significant bits is the address of the particular internal node 403 that is the root to that subtree. For example, in the binary tree 400, the left subtree has as its root the internal node 403a. The leaf-nodes 401a–401h belong to that subtree. The leaf-nodes 401a–401h have a zero as the most significant bit of their addresses. Therefore, the address of internal node 403a is "0".

Similarly, all the leaf-nodes in the subtree rooted by node 403d have "000" as the three most significant bits in their addresses. Therefore, node 403d has as its address "000".

In general terms, according to the present invention, a collision in one contention slot is resolved by allowing only a subset of the subscriber stations 105 to transmit in a subsequent contention slot. This subset is selected by specifying an address of a root of a subtree that is allowed to transmit in the subsequent contention slot used to resolve the collision.

When no collision occurrs in a contention slot, and the SCS 101 receives an upstream data packet from a subscriber station 105, the SCS 101 transmits to the subscriber station 105 an acknowledgement. If the data packet contained a request for a reservation, the acknowledgement also contains a pointer to indicate when the subscriber station 105 should transmit the remainder of the packets.

Figure 6:
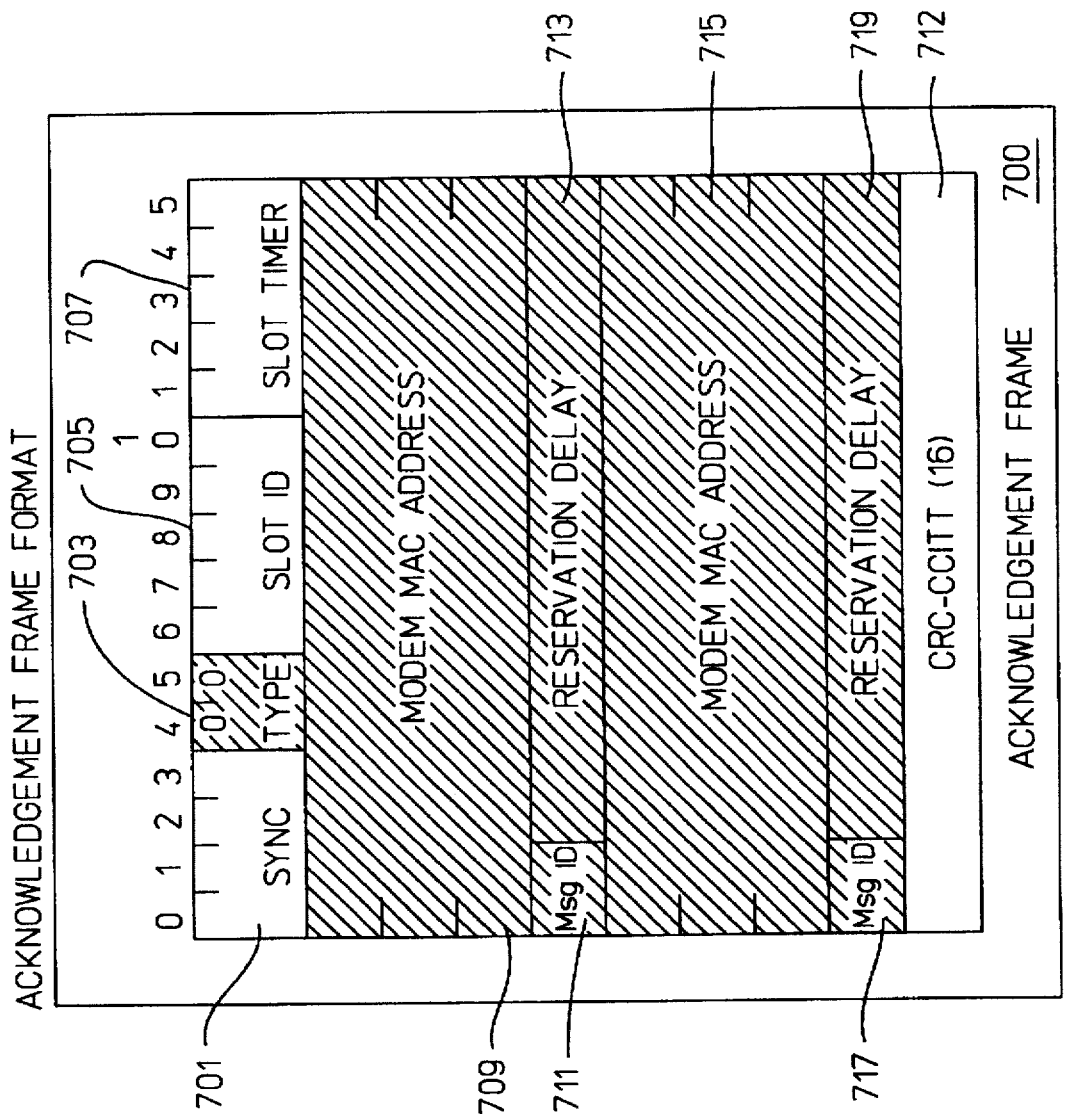
FIG. 6 is a block diagram of the format of a downstream acknowledgement frame sent on the control channel.

FIG. 6 is a block diagram of the format of a downstream acknowledgement frame 700 sent on the control channel. When the Signal Conversion System (SCS) 101 successfully receives a message from one of the client stations 105, as indicating by a successful checksum calculation, the Signal Conversion System (SCS) 101 transmits an acknowledgment frame 700, as shown in FIG. 6. The acknowledgment frame 700, as all other frames, follows the general format of frame 600 of FIG. 5. As such in contains a SYNC field 701, a frame type field 703 ('00' in the case of an Acknowledgment frame 700), slot id 705 and slot timer 707 fields, and a checksum field 721. These fields 701, 703, 705, 707, and 721 correspond to fields 601, 603, 605, 607, and 611, respectively.

The type dependent content 609 of the Acknowledgment frame 700 may be used to acknowledge up to two messages from client stations 105 transmitting on different upstream channels. The modem MAC address of the first of these client stations 105 is given in field 709, and for the second client station 105 in field 715 from a different channel.

When a client station 105 sends a message to the Signal Conversion System (SCS) 101, the client station 105 assigns a message id to that message. The message id being acknowledged is echoed back to the client station 105 by the Signal Conversion System (SCS) 101 in Msg ID field 709 and 717, respectively.

In the event that the message being acknowledged contains a reservation request, the number of slots that the client station 105 must wait before sending the balance is sent in the Reservation Delay fields 713 and 719, respectively.

In the preferred embodiment, the SCS 105 acts as a controller to arrange the conflict resolution tree 400, as shown in FIG. 7(a). In communication systems utilizing the present invention there is no theoretical upper limit on the number of subscriber stations. Therefore, depending on the actual number of subscriber stations 105, the conflict resolution tree 400 may be much larger than the one shown in the example of FIG. 7(a).

A subscriber station 105 may only transmit packets when the SCS 105 gives it permission to send. Such a permission is given either in a contention slot with a subtree address indicating a subtree in which the subscriber station is a member or in a reservation slot dedicated to the subscriber station.

The collision resolution procedure of the present invention includes two procedures, one for the SCS 101 and one for the subscriber stations 101.

Figure 8:
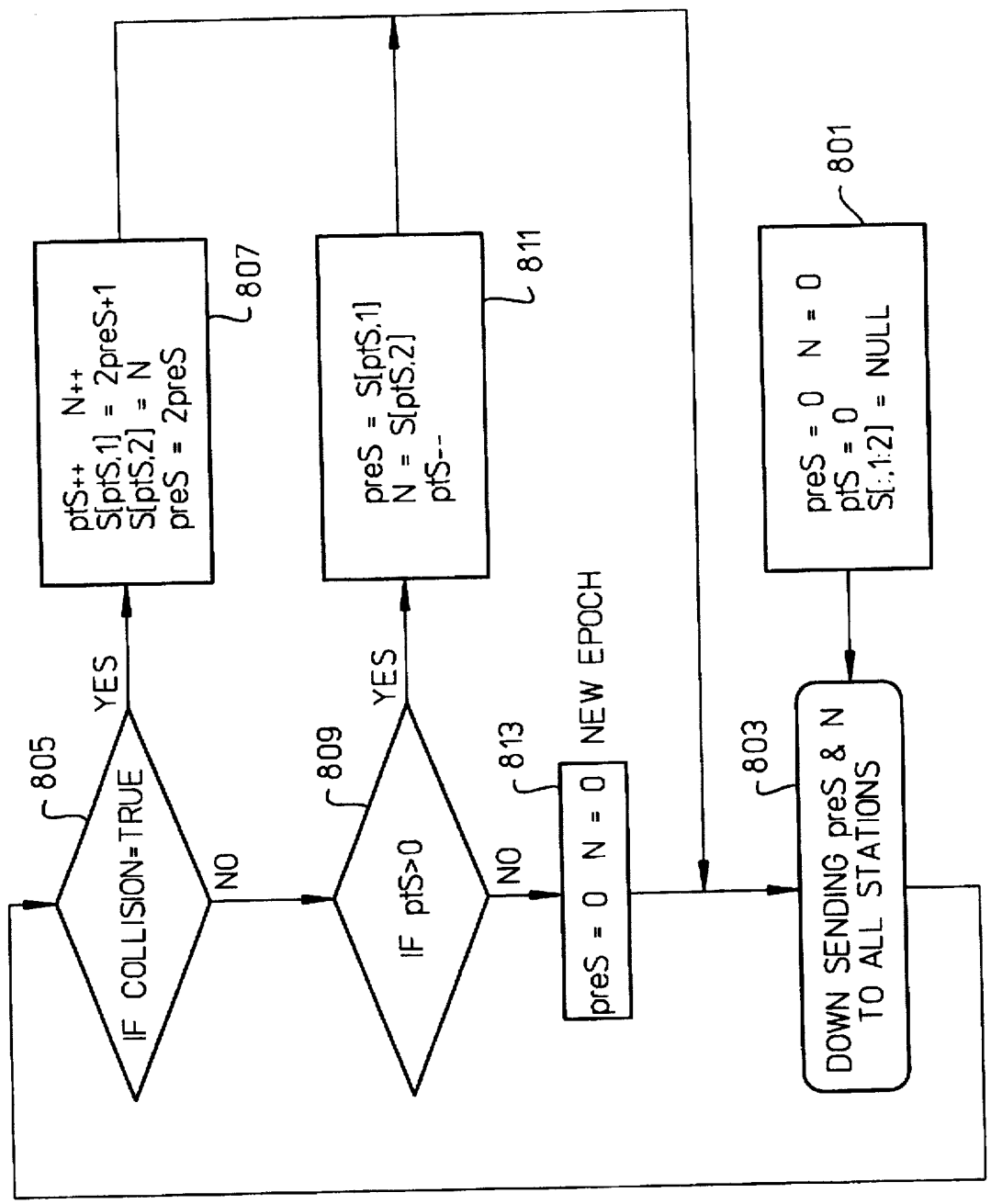
FIG. 8 is a flow chart of the collision resolution procedure of the SCS according to the present invention.

FIG. 8 is a flow chart of the collision resolution procedure for the SCS 101. The collision resolution procudure of the SCS 101 is based on the preorder stack traversal algorithm. Preorder stack traversal is a well known technique in the art of Computer Science. The idea behind stack traversals is to save on a pushdown stack a set of postponed obligations for nodes or tree branches to be traversed later.

The SCS 101 maintains a pushdown stack S that for each entry contains two fields, namely, the state preS and the depth of the state N of the node that makes up the postponed obligation.

The SCS 101 follows the following collision resolution procedure:

(1) [Initialize, step 801.] Let preS be a variable to contain the present state of the traversal in the collision resolution tree 400. preS is zero at the root of the collision resolution tree 400. Let N be a variable to describe the depth of current state in the binary tree. N is defined as zero at the root. Let S be an empty stack. Let ptS be a pointer of the stack. Because the stack S is initialized to empty, ptS is set to zero at the root state.

(2) [Notice station, step 803] Transmit preS and N to all subscriber stations and receive contention result.

(3) [Is there a collision?, step 805] If there is no Collision, then go to step (5).

(4) [Postpone right and descend left, step 807] First, save the state address and the depth of the right branch on the stack to postpone the traversal of the right branch until the left branch has been processed. Then process left branch. The procedure is:

Insrease $ptS$ by one;

set $S(ptS,1) = RLINK(preS)$, and set $S(ptS,2) = RLINK(N)$;

set $preS = LLINK(preS)$ and $N = LLINK(N)$; go to step (2).

Where $RLINK(preS) = 2\ preS + 1$, $LLINK(preS) = 2\ preS$, $RLINK(N) = LLINK(N) = N + 1$.

(5) [Is current epoch done?, step 809] If the stack S is empty, i.e., the stack pointer ptS=0, then start a new epoch (because no more postponed work remains). Otherwise, process what is on the stack by popping the top state of off the stack:

set preS=S(ptS,1) and N=S(ptS,2), decrease ptS by one, go to step (2).

The subscriber stations 105 follow the procedure that each subscriber station 105 only transmits data packets when the first N bits of the subscriber station's physical address is equal to the current state, preS, in the binary tree traversal, where N and preS are transmitted by the SCS 101 and updated every slot. For example in the collision resolution tree 400, when N=0 (root), all stations can transmit; when N=3 and preS=101, only stations 1010 and 1011 can send requests (see FIG. 7(a)).

A difference between the free access deterministic addressing tree collision resolution procedure of the present invention and the conventional static tree algorithm is that in the present invention data packets that arrive at a subscriber station during a collision resolution epoch may be transmitted by that subscriber station. In the conventional tree algorithm, the packets arriving to nonactive sources in one epoch, i.e., subscriber stations 105 that did not send packets during the contention slot that resulted in a collision being resolved, are not transmitted until the following epoch. The packets arriving to any subscriber station 105 may be transmitted by the subscriber station 105 as soon as the subscriber station receives permission from the SCS 101, as indicated by the quantities preS and N. Therefore, new packets arriving to subscriber stations 105 whose collision has not been resolved will be processed during the current epoch.

Another improvement to the conventional algorithm is that the two halves of a division do not transmit their packets in two consecutive slots. The right half is saved on the stack and is not transmitted until the left half has been processed. Thus, the present invention achieves the advantage that the station-dependent-window width is the same for all subscriber stations 105.

In the collision resolution procedure, the state-to-state traversal is based on the previous contention result. If the propagation delay of the network is not zero, the SCS must wait several slot intervals before another state can be selected.

In one embodiment of the present invention, the transmission efficiency is improved by utilizing an interleave. If the round trip delay of the network is n slots, then n independent collision resolution trees 400 are maintained by the SCS 101. According to their physical addresses, all stations are grouped into n groups, each group belongs to a different collision resolution tree. Each tree maintains its own global status for its group membership in its interleave. The procedures described above in conjunction with FIG. 8 applies to each collision resolution subtree. A group index, G, is used to distinguish stations in one group from other groups. In this alternative embodiment, the SCS 101 transmits three variables instead of two, namely, G, N(G), and preS(G). A subscriber station 105 is permitted to transmit a data packet only when all three variables match its group and location in the collision resolution tree corresponding to the group.

For example, assuming the round trip delay of network is 4 slots, then 4 collision resolution trees are maintained by the SCS 101. If there are a total of sixteen subscriber stations 105 connected to the network, each of these collision resolution trees contains 4 subscriber stations are allocated to the various collison resolution trees so as to distribute the communication load evenly.

When a new subscriber station 105 is connected to the network or when a subscriber station 105 is reinitialized, it is assigned to one of the existing groups. To make its presence known to the SCS 101, the new subscriber station 105 only transmits in the slots corresponding to the root level of the collision resolution trees of any group. In other words, a new subscriber station 105 is allowed to contend when N(G)=0 and preS(G)=0 for any value of G. If the new subscriber station 105 encounters a collision in that contention slot, it backs off using a back off algorithm, for example, by waiting a random number of contention slots having N(G)=0 and preS(G)=0 for any value of G.

When a new subscriber station 105 is added to the network, the SCS also assigns that subscriber station to a leaf-node 401. The assignment of leaf-nodes 401 is done in such a way as to keep the population of stations balanced over the entire collision resolution tree 400. For example, in the collision resolution tree 400 of FIG. 7(a), the first station to be added to the tree would be added as node 401a (address 0000), the second station as node 401i (address 1000), the third as node 401e (address 0100), the fourth station as node 401m (address 1100), etc.

Figure 7B:
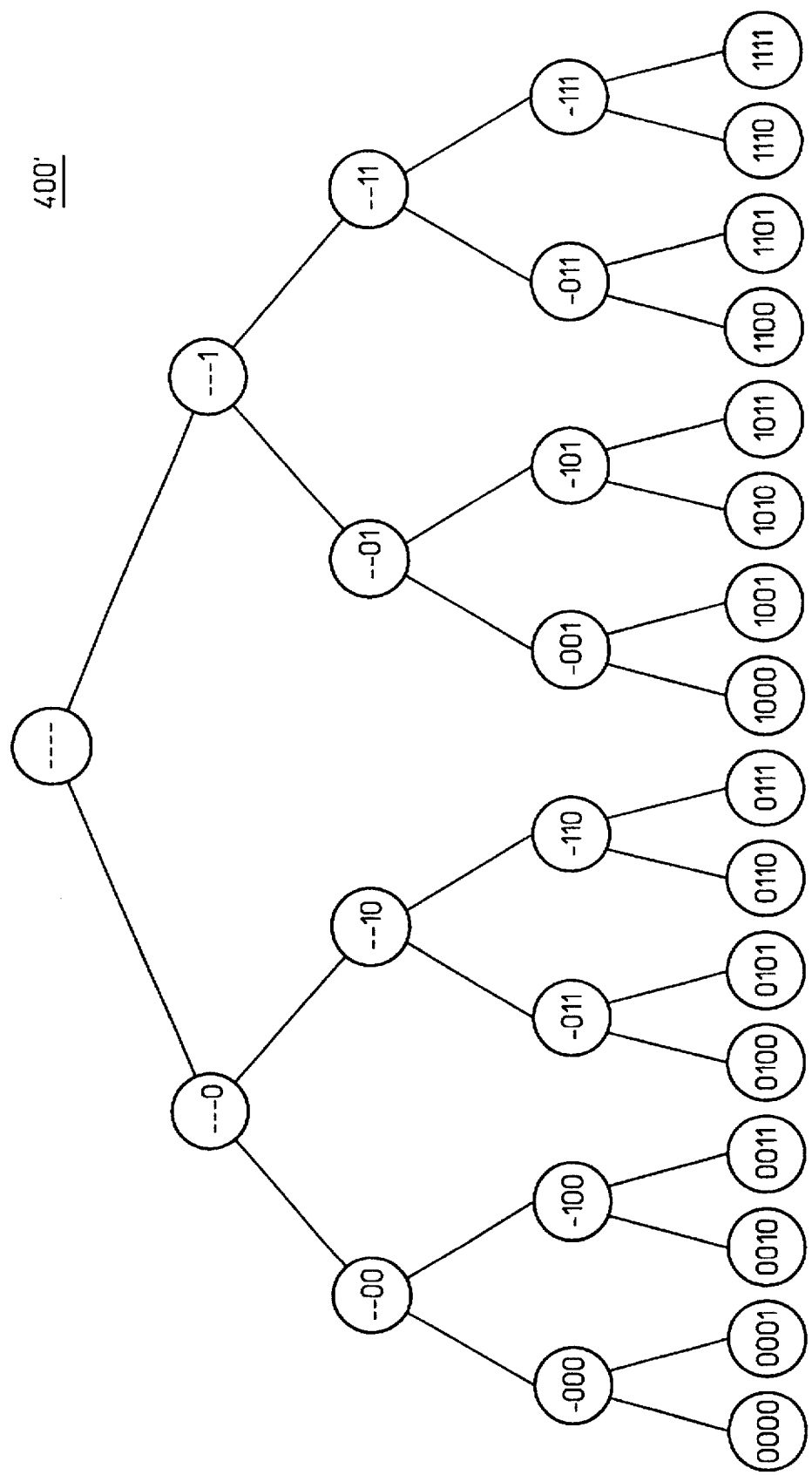
FIG. 7(b) is a schematic of an alternative exemplary collision resolution tree.

FIG. 7(b) shows an alternative collision resolution tree 400', in which nodes are allocated such that given a numerical sequence of address numbers the collision resolution tree 400' automatically becomes populated in a balanced fashion. The collision resolution procedures of the SCS 101 and the subscriber stations 105 would be modified accordingly to take into account that the internal nodes' addresses match the last N bits of the leaf-node addresses, rather than the first N bits as discussed above in conjunction with FIG. 7(a) and FIG. 8.

In yet another alternative embodiment, the performance of the collision resolution procedure is further improved based upon the observation that an idle slot, immediately following a collision, is always followed by a collision. Therefore, the corresponding state may be skipped, resulting in better performance. To realize the state skipping approach, the SCS 101 identifies an idle slot. An idle sensor is utilized for that purpose.

Figure 9:
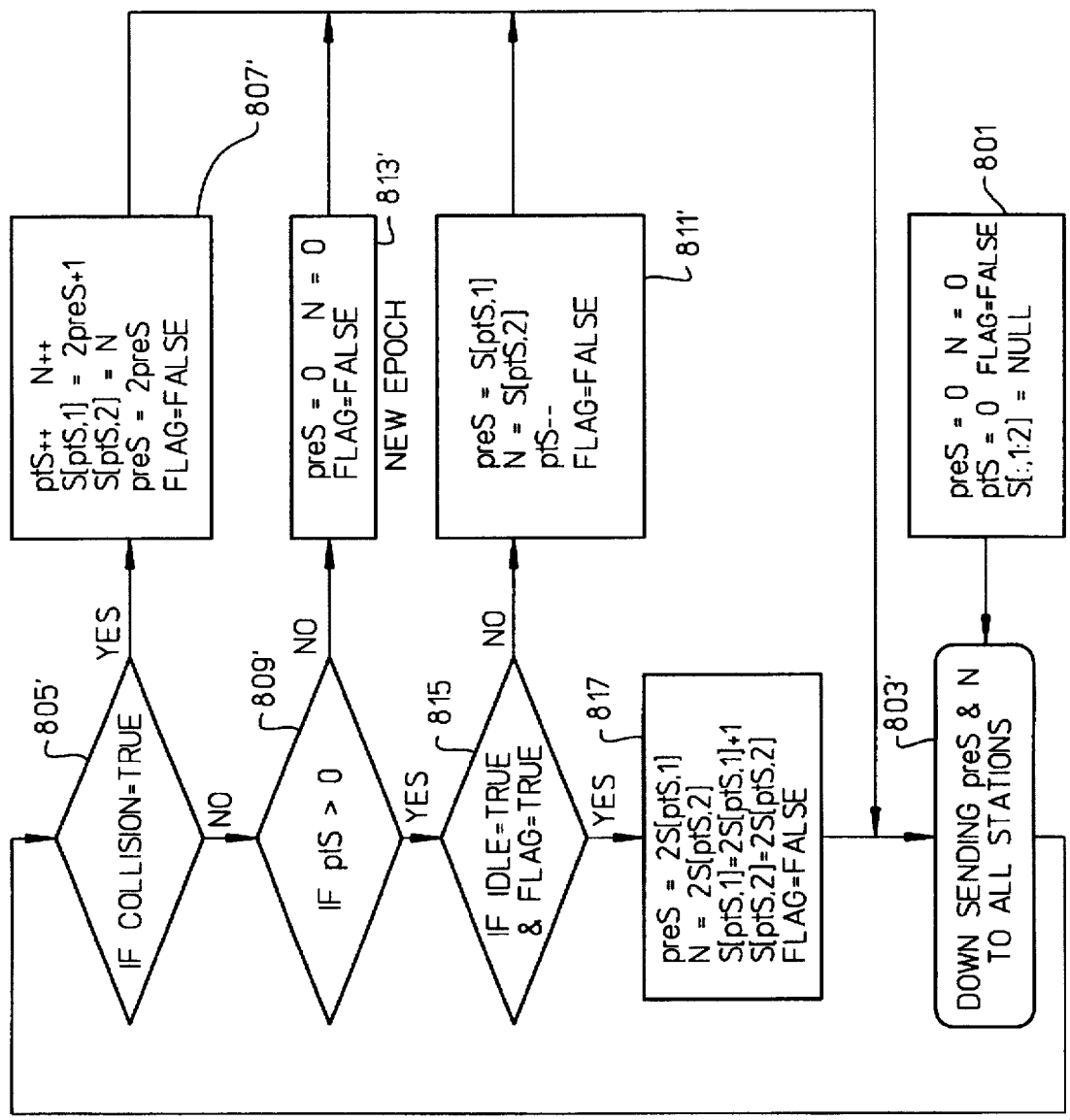
FIG. 9 is a flow chart of the collision resolution procedure of the SCS incorporating state skipping according to the present invention.

FIG. 9 is a flow chart of the collision resolution procedure with the state skipping approach. The procedure of FIG. 8 is augmented with two additional variables. The first is an Idle indicator which is set by the idle sensor. The second is a Flag for indicating if a collision has occurred in the slot. The Flag is initialized to false, step 801' (The steps in FIG. 9 with a reference numeral augmented with an apostrophe (') correspond to the step in FIG. 8 which bears the same numeral without the apostrophe). The collision Flag is set in step 807' in response to a collision being detected in Step 805'.

In response to no collision occurring, the Flag is cleared, steps 813', step 811', and step 817. If Step 809' indicates that the stack S is not empty, then the Idle indicator and the collision Flag are checked. If both are set, the SCS 101 knows that checking the state that is currently on the top of the stack would result in a collision, and, therefore skips that state. The state skip is carded out by step 817. By setting preS to twice the value of the state field of the top of the stack S and N to twice the value of the depth field of the top of the stack S, the left subtree of the node pointed to by the top of the stack S is selected. The top of the stack is made to point to the right sub tree.

FIG. 6 is a block diagram of the format of a downstream acknowledgement frame 700 sent on the control channel. When the Signal Conversion System (SCS) 101 successfully receives a message from one of the client stations 105, as indicating by a successful checksum calculation, the Signal Conversion System (SCS) 101 transmits an acknowledgment frame 700, as shown in FIG. 6. The acknowledgment frame 700, as all other frames, follows the general format of frame 600 of FIG. 5. As such in contains a SYNC field 701, a frame type field 703 ('00' in the case of an Acknowledgment frame 700), slot id 705 and slot timer 707 fields, and a checksum field 721. These fields 701, 703, 705, 707, and 721 correspond to fields 601, 603, 605, 607, and 611, respectively.

The type dependent content 609 of the Acknowledgment frame 700 may be used to acknowledge up to two messages from client stations 105 transmitting on different upstream channels. The modem MAC address of the first of these client stations 105 is given in field 709, and for the second client station 105 in field 715 from a different channel.

When a client station 105 sends a message to the Signal Conversion System (SCS) 101, the client station 105 assigns a message id to that message. The message id being acknowledged is echoed back to the client station 105 by the Signal Conversion System (SCS) 101 in Msg ID field 709 and 717, respectively.

In the event that the message being acknowledged contains a reservation request, the number of slots that the client station 105 must wait before sending the balance is sent in the Reservation Delay fields 713 and 719, respectively.

According to the present invention, each subscriber station 105 maintains a queue for storing data packets to be transmitted to the SCS 101. If the number of packets in the queue for any given subscriber station 105 is greater than one, in a contention slot, the subscriber station 105 transmits the head-of-queue packet with a reservation request for the remaining packets. If the contention slot is for a subtree of the collision resolution tree 400 and the additional packets have been added to the queue during the collision resolution procedure, the subscriber station 105 modifies the packet it sends in the contention slot accordingly. Thus, the reservation request transmitted always reflects the current length of the queue.

While in operation, the Signal Conversion System (SCS) 101 continuously transmits control frames. Thus, if during a particular time-slot the Signal Conversion System (SCS) 101 has no down-stream information to send, the Signal Conversion System (SCS) 101 nevertheless sends a control frame.

The Channel/Slot status subframe type is sent by the client station 101 as the first frame of each time slot. This frame carries the occupancy status of the next time slot for each active upstream channel as well as the information of the current available upstream and downstream channel. The Channel/Slot status subframe includes fields for indicating the channel occupancy (contention, reservation), the group number (G), the state address preS(G), and the depth (N).

Figure 10:
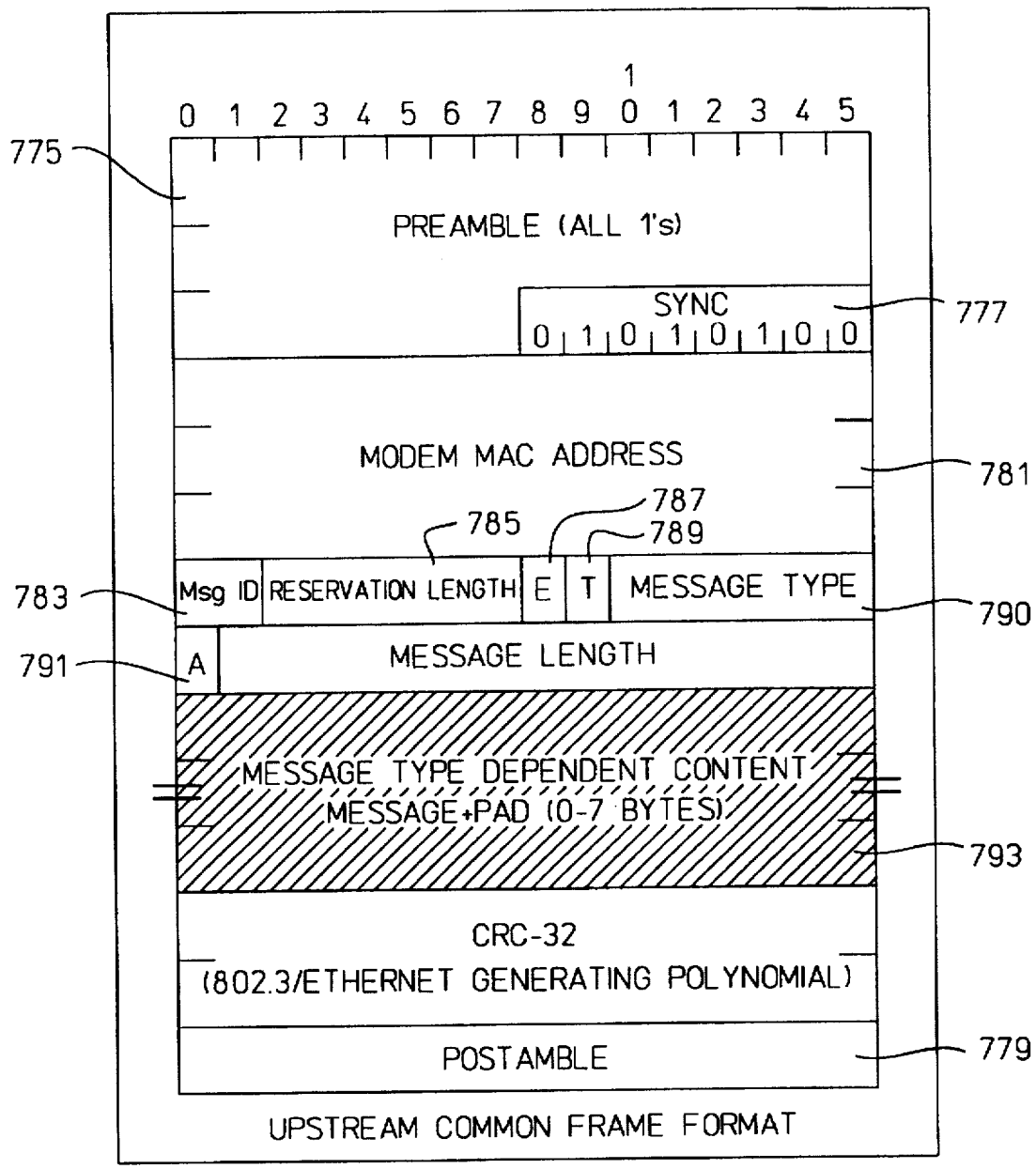
FIG. 10 is block diagram of a common format for an upstream channel frame.

The Upstream frames carry subscriber data from client stations 105 as well as Modem Control Messages from the CMs 113. The Upstream frames also contain time slot reservation requests from the CMs 113 for transferring packets too large to be communicated in one packet. FIG. 10 is a block diagram of a common format for an Upstream channel frame 773. The first field is a five-byte preamble field 775 of all 1s followed by a one byte SYNC flag 777 containing "01010100". Fields 775 and 777 denote the beginning of an upstream frame. Frames are ended with a pad field 779 that ensures that the total length of the frame is no less than MinTU (the minimum size of an upstream data frame.

Field 781 contains the six-byte MAC address of the CM 113. Field 783, the Message ID Field, is a 2-bit field that contains a message number assigned by the CM 113 randomly. The SCS 101 when acknowledging a message includes this message number.

Field 785 is the reservation length field. This field is a six-bit field indicates to the SCS 101 the number of time slots the CM 113 needs to transfer one or more packets. The Reservation Length Field 785 is ignored if it contains all zeros. Any packet that is larger than MaxTU must be transferred through reserved time slots. In the preferred embodiment, recursive reservation is not permitted.

The present invention has been described in the context of multiple subscriber stations connected via a shared cable to an SCS. The selection of a subscriber stations and SCS are purely exemplary in nature. The various procedures disclosed herein are applicable to any shared communication channel. That channel can be a wireless communication channel, for example, the communication by multiple ground stations and a communication satellite.

As a person skilled in the art will realize that numerous modifications and changes may be made to the present invention, it is not desired to limit the invention to the exact construction and operation as illustrated and described. Hence, all suitable modifications and equivalents may be resorted to as falling within the scope of the invention.

We claim:

1. A method for collision resolution in a communication system having multiple transmission stations communicating on a shared communication channel in which transmission is subdivided into a plurality of transmission slots, comprising the steps of:

a. organizing the stations in a structure wherein each station has a fixed address corresponding to a location in said structure;

b. indicating to said multiple stations a slot type for each transmission slot, such that each transmission slot is either a contention slot or a reservation slot wherein each reservation slot is reserved for use by a particular one of the stations and each contention slot may be used by any of the stations;

c. accepting transmissions of data packets on said communication channel from said stations during said contention slots, said data packets each optionally containing a reservation quantity for requesting a specific number of said contention slots as future reservation slots for use by a station that originated a data packet containing the reservation quantity;

d. detecting collisions in said transmissions of said data packets; and e. upon detecting a collision in said contention slots:

f. in a subsequent contention slot associating with said contention slot an address indicating a subset of said locations in said structure, wherein membership in said subset indicates that a station corresponding to a location in said subset is entitled to transmit in said subsequent contention slot regardless of whether said station transmitted during said contention slot in which said collision occurred;

g. after having resolved collisions in said subset, repeating step f with addresses indicating other subsets of said structure.

2. The method for collision resolution of claim 1, wherein said structure is a Q-ary tree, and wherein said subset is a subtree of said Q-ary tree, further comprising the step of:

h. detecting whether transmission in said subsequent contention slot results in a collision;

i. if transmission in said subsequent contention slot results in a collision, subdividing said subtree into subtrees of said sub tree and recursively repeating said steps f,g,h, and i.

3. The method of claim 2 wherein said resursive repetion of steps f,g,h, and i is a pre-ordered stack traversal of said Q-ary tree.

4. The method of claim 3 wherein said Q is two.

5. The method for collision resolution of claim 1 further comprising the step of:

j. dedicating n slots following a successful transmission of a packet in a contention slot as reservation slots dedicated to said station from which said data packet containing said reservation quantity originated, wherein n is the reservation quantity transmitted in said successfully transmitted packet; and k. transmitting to said station a pointer indicating to said station in which subsequent slots to transmit one or more reservation slot data packets.

6. The method for collision resolution of claim 1, wherein said communication system has a controller station and multiple subscriber stations, and further comprising the step of:

l. grouping said multiple subscriber stations into a plurality of groups, wherein a group number is associated with each such group.

7. The method for collision resolution of claim 6 wherein the number of groups is dependent on propagation delay.

8. The method for collision resolution of claim 6 wherein said step a further comprises the step of organizing the stations in each group into a separate structure.

9. The method of collision resolution of claim 8 further comprising the step of allowing subscriber stations not yet assigned to a group to transmit when said address indicates that all subscriber stations in any group may transmit; and upon successful transmission by said subscriber station not yet assigned to a group assigning said subscriber station to a group and assigning an address for said subsciber station in said structure corresponding to said group.

10. The method of collision resolution of claim 6 further comprising the step of:

m. Associated a group number with each transmission slot; and n. in a transmission slot with a group number G, allowing transmission only from those stations that have associated therewith a group number G.

11. A data communications system having a signal conversion system (SCS) and a plurality subscriber stations, comprising:

a. said signal conversion system (SCS) operable to transmit a control signal on a first transmission channel time divided into a plurality of slots, wherein said SCS is further operable to:

b. for each slot, transmit a slot type selected from a group including contention slot, reservation slot, and collision resolution slot;

c. receive data packets on a second channel divided into a plurality of slots;

d. detect collisions in any given slot on said second channel;

e. upon detection of a collision, transmitting a collision resolution slot type and a subtree address in the next slot following said given slot, wherein said subtree address indicates a subset of said plurality of subscriber stations regardless of whether subscriber stations indicated in said subset transmitted during the given slot;

f. upon detection of a successful receipt of a packet, transmitting an indication on said first channel that the next n slots on said second channels are reservation slots, wherein n is a reservation quantity received in said successfully received packet that indicates a number of future reservation slots dedicated to one of the subscriber stations; and g. said plurality of subscriber stations each operable to receive said control signal from said SCS and operable to transmit data packets to said SCS on a second channel, wherein said subscriber stations are each operable to:

h. detect the slot type of a given slot and a subtree address;

i. if at a given point in time said subscriber station has at least one packet to transmit, and if said slot is either a contention slot or if said slot is a collision resolution slot and said address indicates that said subscriber station is in said subset indicated by said address, then transmitting a first of said packets, wherein said first of said packets contain a reservation length n equal to the number of remaining packets;

j. if a subscriber station receives an acknowledgment from said SCS indicating successful receipt of a packet transmitted by said subscriber station in a contention slot, and if n is greater than zero, transmitting said remaining packets in the next n slots.

12. The communication system of claim 11, wherein said SCS indicates the slot type by using said address, wherein a first address indicates that any subscriber station may transmit in a given slot, an address corresponding exactly to a particular subscriber station indicates that only that subscriber station may transmit in said given slot, and that other addresses indicate subsets of subscriber stations that may transmit in said given slot.

* * * * *